United States Patent
Sekine

(10) Patent No.: US 9,753,633 B2
(45) Date of Patent: Sep. 5, 2017

(54) INFORMATION PROCESSING APPARATUS AND METHOD FOR ARRANGING ELEMENTS ON A DISPLAY REGION

(71) Applicant: FUJI XEROX CO., LTD., Minato-ku, Tokyo (JP)

(72) Inventor: Yoshihiro Sekine, Kanagawa (JP)

(73) Assignee: FUJI XEROX CO., LTD., Minato-ku, Tokyo (JP)

(*) Notice: Subject to any disclaimer, the term of this patent is extended or adjusted under 35 U.S.C. 154(b) by 382 days.

(21) Appl. No.: 13/899,135

(22) Filed: May 21, 2013

(65) Prior Publication Data
US 2014/0115512 A1 Apr. 24, 2014

(30) Foreign Application Priority Data
Oct. 23, 2012 (JP) .................................. 2012-233669

(51) Int. Cl.
*G06F 3/048* (2013.01)
*G06F 3/0486* (2013.01)
(Continued)

(52) U.S. Cl.
CPC ........ *G06F 3/0486* (2013.01); *G06F 3/04817* (2013.01); *G06F 3/04883* (2013.01); *G06F 3/04886* (2013.01)

(58) Field of Classification Search
CPC ............... G06F 3/0486; G06F 3/04817; G06F 17/30598; G06F 17/30867; G06F 3/0488;
(Continued)

(56) References Cited

U.S. PATENT DOCUMENTS

| 7,739,604 B1* | 6/2010 | Lyons et al. .................. 715/736 |
| 2004/0150664 A1 | 8/2004 | Baudisch |

(Continued)

FOREIGN PATENT DOCUMENTS

| JP | 06-168093 A | 6/1994 |
| JP | 08-320755 A | 12/1996 |

(Continued)

OTHER PUBLICATIONS

Communication dated Feb. 2, 2016, from the Japanese Patent Office in counterpart application No. 2012-233669.
(Continued)

*Primary Examiner* — Tadeese Hailu
(74) *Attorney, Agent, or Firm* — Sughrue Mion, PLLC

(57) ABSTRACT

An information processing apparatus includes a display, a detector, a setting unit, an approaching display unit, and an element processor. The display displays an image including one or more elements on a display region of the display. The detector detects an operation in the display region. In response to detection of a first operation including specifying a specified point in the background, the setting unit sets a first region that is the entirety or a portion of the display region in accordance with the first operation. The approaching display unit displays element information relating to a first element displayed in the first region at a position closer to the specified point than the first element prior to detection of the first operation. In response to detection of a second operation on the element information, the element processor executes a process corresponding to the second operation on the first element.

23 Claims, 13 Drawing Sheets

(51) Int. Cl.
*G06F 3/0488* (2013.01)
*G06F 3/0481* (2013.01)

(58) Field of Classification Search
CPC ........ G06F 3/0481; G06F 3/016; G06F 3/065;
G06F 3/0619; G06F 3/0647; G06F
2212/6026; G06F 17/30126; G06F 3/017;
G06F 17/30699
See application file for complete search history.

(56) References Cited

U.S. PATENT DOCUMENTS

| | | | |
|---|---|---|---|
| 2009/0307623 A1* | 12/2009 | Agarawala et al. | 715/765 |
| 2010/0313124 A1* | 12/2010 | Privault et al. | 715/702 |
| 2011/0291985 A1 | 12/2011 | Wakako et al. | |

FOREIGN PATENT DOCUMENTS

| | | | |
|---|---|---|---|
| JP | 2001-109692 A | 4/2001 | |
| JP | 2005196740 A | 7/2005 | |
| JP | 2005310059 A | 11/2005 | |
| JP | 2006311498 A | 11/2006 | |
| JP | 2012009009 A | 1/2012 | |

OTHER PUBLICATIONS

Communication dated Jul. 19, 2016, from the Japanese Patent Office in counterpart application No. 2012-233669.

* cited by examiner

INFORMATION PROCESSING APPARATUS AND METHOD FOR ARRANGING ELEMENTS ON A DISPLAY REGION

CROSS-REFERENCE TO RELATED APPLICATIONS

This application is based on and claims priority under 35 USC 119 from Japanese Patent Application No. 2012-233669 filed Oct. 23, 2012.

BACKGROUND

Technical Field

The present invention relates to an information processing apparatus and method.

SUMMARY

According to an aspect of the invention, there is provided an information processing apparatus including a display, a detector, a setting unit, an approaching display unit, and an element processor. The display displays an image including the arrangement of one or more elements on a display region of the display. The detector detects an operation performed in the display region. The setting unit sets, in response to detection, by the detector, of a first operation including an operation in which a point in the background of the display region where no element is displayed is specified as a specified point, a first region that is the entirety or a portion of the display region in accordance with details of the first operation. The approaching display unit displays element information relating to a first element displayed in the first region, set by the setting unit, at a position closer to the specified point than the position of the first element prior to detection of the first operation. The element processor executes, in response to detection, by the detector, of a second operation performed on the element information, a process corresponding to the second operation on the first element.

BRIEF DESCRIPTION OF THE DRAWINGS

An exemplary embodiment of the present invention will be described in detail based on the following figures, wherein.

DETAILED DESCRIPTION

Configuration of Exemplary Embodiment

Figure 1:
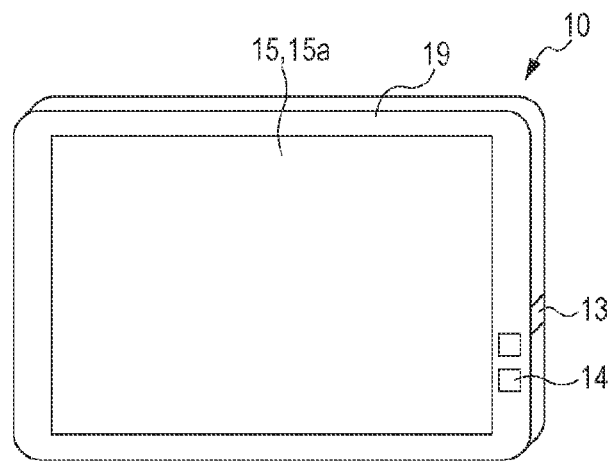
FIG. 1 is a diagram illustrating the external appearance of an information processing apparatus.
Figure 2:
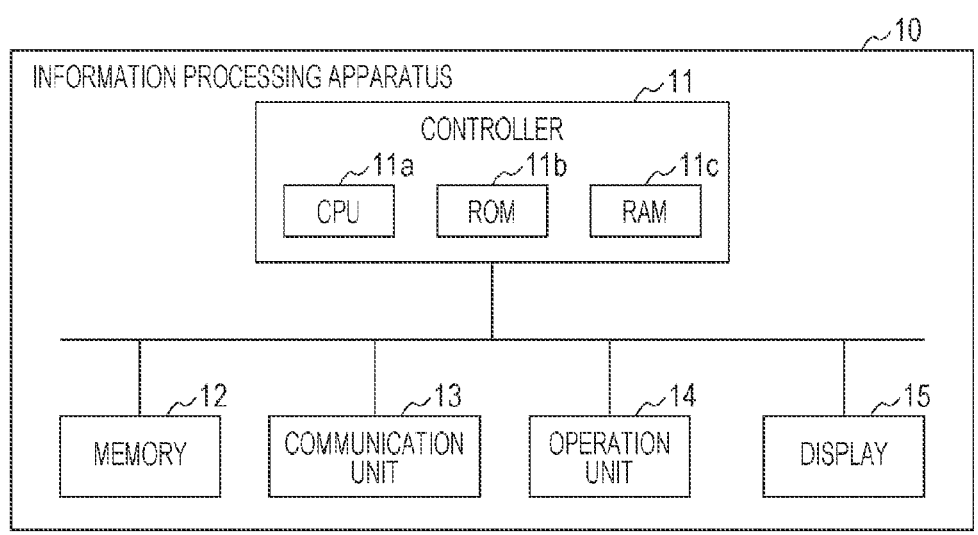
FIG. 2 is a diagram illustrating the hardware configuration of the information processing apparatus.

FIG. 1 is a diagram illustrating the external appearance of an information processing apparatus 10. FIG. 2 is a diagram illustrating the hardware configuration of the information processing apparatus 10. The information processing apparatus 10 is a computer with a touch panel type graphical user interface (GUI). The information processing apparatus 10 includes a controller 11, a memory 12, a communication unit 13, an operation unit 14, a display 15, and a housing 19.

The controller 11 includes an arithmetic unit such as a central processing unit (CPU) 11a, and storage devices such as a read-only memory (ROM) 11b and a random-access memory (RAM) 11c.

The memory 12 includes storage devices such as an electronically erasable and programmable read-only memory (EEPROM) and a static random-access memory (SRAM). The memory 12 stores an operating system (OS) and an application program. By executing these programs, the controller 11 controls the operation of the information processing apparatus 10.

The communication unit 13 includes communication interfaces such as Universal Serial Bus (USB) and a wireless local area network (LAN). In accordance with an operation accepted by the operation unit 14 or the display 15, the controller 11 communicates with another information processing apparatus via the communication unit 13.

The operation unit 14 includes an operator such as a power switch.

The display 15 is a display device using liquid crystal or organic electro-luminescence (EL) devices. The display 15 has a touch panel function, and detects an operation performed by a user on a display region 15a of the display 15. In accordance with the detected operation, the controller 11 causes the information processing apparatus 10 to operate.

The touch panel may be of any type, such as an electrostatic capacitance type, an electromagnetic induction type, a resistive film type, a surface acoustic wave (SAW) type, or an infrared type. The exemplary embodiment discusses an example in which a touch panel is of a type in which an operation is performed when the user touches the display region 15a with his/her finger or the like (such as an electrostatic capacitance type).

The display region 15a is a planar region whose outer edge is, for example, rectangular. The display region 15a may be of any size. Also, the information processing apparatus 10 may be of any configuration as long as the information processing apparatus 10 has a touch panel type GUI. For example, the information processing apparatus 10 may be an apparatus in which the size (the length of a diagonal) of the display region 15a ranges from a few inches to a dozen inches, which is referred to as a tablet personal computer (PC), or a large-size apparatus of a wall-hung type or a self-standing type placed on the floor, in which the size of the display region 15a ranges from a few tens of inches to a hundred and several tens of inches.

Figure 3:
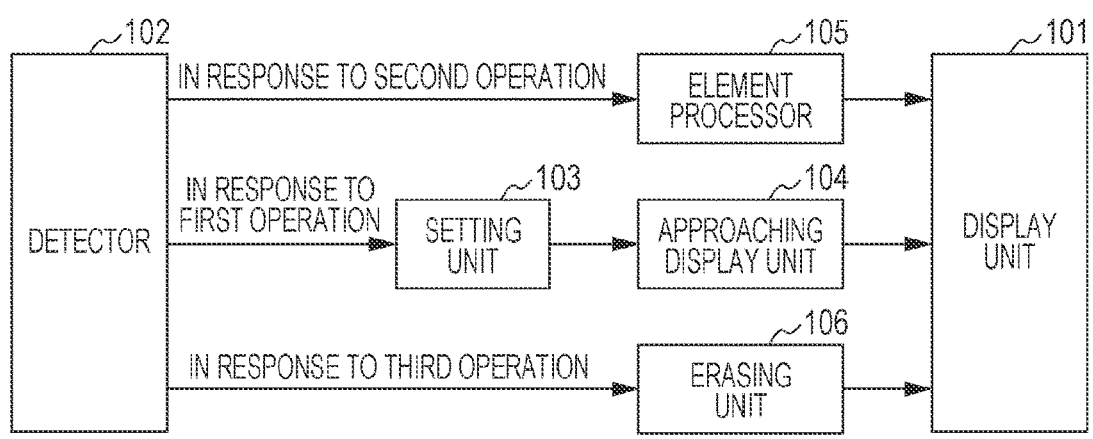
FIG. 3 is a diagram illustrating the functional configuration of the information processing apparatus.

FIG. 3 is a diagram illustrating the functional configuration of the information processing apparatus 10. The functions of the information processing apparatus 10 are realized by executing, by the controller 11, the OS and application program stored in the memory 12.

A display unit 101 displays an image including the arrangement of one or more elements in the display region 15a of the display 15. Specific details are as follows.

The memory 12 stores desktop data that associates each of the elements to be displayed in the display region 15a with the position of that element in the display region 15a. The elements are icons, windows, and the like. On the basis of the desktop data, the controller 11 displays, in the display region 15a, an image representing a desktop in which these elements are arranged. In accordance with an operation performed in the display region 15a, the controller 11 updates the desktop data and updates the image in the display region 15a. Even when the power of the information processing apparatus 10 is turned off, the desktop data is continuously stored in the memory 12.

An icon represents a file, a folder (may also be referred to as a "directory"), an execution file of an application program, or a shortcut to the file or folder (may also be referred to as a "soft link" or "alias") in picture. In the display region 15a, for example, the lattice points of a square lattice are virtually set (the lattice points are not displayed), and each icon is arranged so that the center of the icon is positioned at any of the lattice points. Also, icons are arranged not to overlap one another.

A window displays, when an element is a folder, a frame that represents the folder, and, within this frame, displays the icons of elements (folders, execution files, shortcuts, or the like) associated with the folder as elements that belong to the folder.

Next, a detector 102 will be described.

The detector 102 detects an operation performed in the display region 15a. Specific details are as follows.

Major operations in the exemplary embodiment are slide, tap, and double tap.

Sliding is an operation in which the user keeps touching, with his/her finger, the background of the display region 15a and moves the finger. The background is a portion of the display region 15a in which no element is displayed. The operation of the information processing apparatus 10 in the case where sliding is performed will be described later.

Tapping is an operation in which the user hits the display region 15a with his/her finger. For example, when an element is tapped, the controller 11 recognizes that the element is selected, and changes the display status (tone, brightness, etc.) of this element.

Double tapping is an operation in which the user performs tapping twice within a determined time. A process to be performed in the case where an element is double-tapped is predetermined in accordance with the type of the element. For example, when the element is the icon of a file, the controller 11 executes an application program used to create that file, and displays the details of the file. When the element is the icon of an execution file, the controller 11 executes the execution file. A process to be performed in the case where double tap is performed in the background will be described later.

While the user's finger is touching the display region 15a, the display 15 periodically outputs contact position information representing the contact position of the finger to the controller 11. On the basis of the contact position information, the controller 11 specifies the details of the operation. For example, when the length of time in which the user's finger continuously touches the display region 15a is less than or equal to a first threshold, the controller 11 specifies that this operation is tapping. When the length of time between two consecutive taps is less than or equal to a second threshold, the controller 11 specifies that this operation is double tapping.

When the length of time in which the user's finger continuously touches the display region 15a exceeds the first threshold, the controller 11 calculates the speed of movement of the finger from the contact position information. When the speed of movement exceeds a third threshold, it is determined that sliding is performed. When the speed of movement that exceeds the third threshold becomes less than or equal to the third threshold, it is determined that sliding is stopped.

Next, a setting unit 103 and an approaching display unit 104 will be described.

In response to detection, by the detector 102, of a first operation including an operation in which a point in the background of the display region 15a where no element is displayed is specified as a specified point, the setting unit 103 sets a first region that is the entirety or a portion of the display region 15a in accordance with the details of the first operation.

The approaching display unit 104 displays element information relating to a first element displayed in the first region, set by the setting unit 103, at a position closer to the specified point that the position of the first element prior to detection of the first operation. The above-described process performed by the approaching display unit 104 will be referred to as an approaching display process. Specific details are as follows.

The first operation in the exemplary embodiment is either double tapping or sliding the background. Double tapping corresponds to the case in which the first operation includes no operation of moving the specified point, whereas sliding corresponds to the case in which the first operation includes an operation of moving the specified point.

Figure 4:
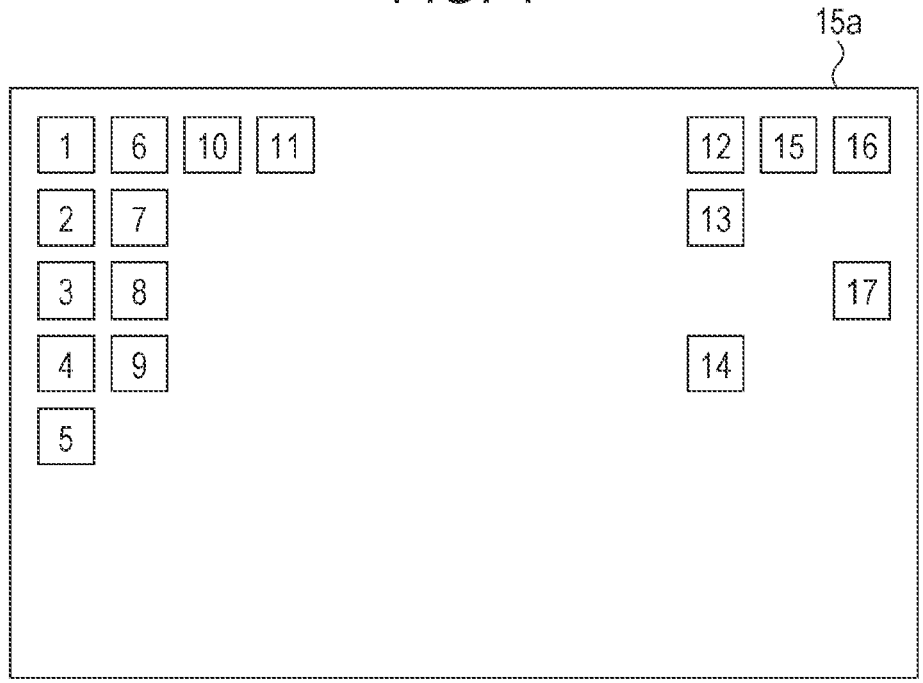
FIG. 4 is a diagram illustrating a display region.

FIG. 4 is a diagram illustrating the display region 15a. A rectangle arranged in the display region 15a represents an element. A numeral (from 1 to 17) in the rectangle of each element is a numeral assigned to distinguish multiple elements in this description for the sake of explanatory convenience. Actually, a picture representing the type of each element and a unique name of that element are displayed. When an element is a file, a picture representing the type of that element is a picture symbolizing an application program used to create that file. When an element is a folder, a picture representing the type of that element is a picture symbolizing that folder. When an element is an execution file, a picture representing the type of that element is a picture symbolizing an application program of that execution file. Alternatively, when an element is a file, a picture that is a size-reduced image representing the details of that file (thumbnail) may be displayed. The unique name of each element is a file name, a folder name, an application program name, or the like.

Figure 5:
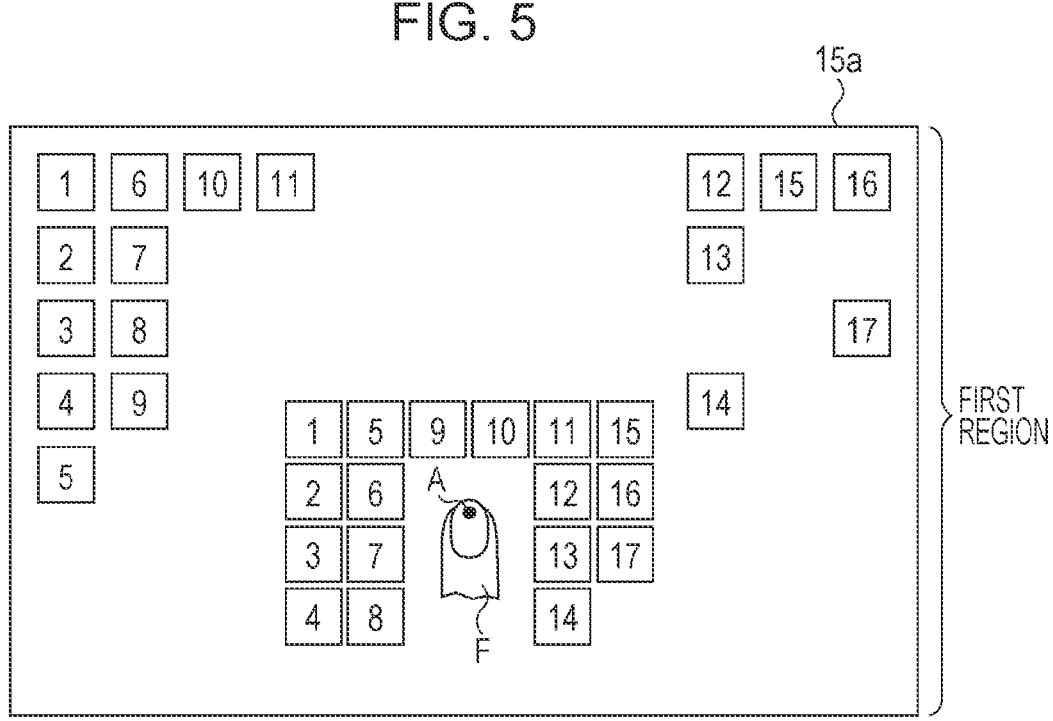
FIG. 5 is a diagram illustrating the arrangement of pieces of element information after an approaching display process is performed.

FIG. 5 is a diagram illustrating the arrangement of pieces of element information after an approaching display process is performed. A point A is a specified point specified with a finger F. When double tapping the background is detected, the controller 11 sets the entire display region 15a as a first region. Therefore, all the elements displayed in the display region 15a become first elements, that is, targets of an approaching display process performed by the approaching display unit 104, and pieces of element information relating to these first elements are displayed at positions closer to the specified point than the positions of the first elements.

In the example illustrated in FIG. 5, the pieces of element information are duplicates of the first elements. In this example, the first elements are displayed at the same positions as before the approaching display process. However, the first elements may not be displayed. Alternatively, the first elements themselves may be moved to positions closer to the specified point than the positions before the approaching display process. Alternatively, the display status of the first elements may be made different from that of the pieces of element information. For example, the first elements may be made darker than they were before the approaching display process.

In the approaching display process, the approaching display unit 104 arranges the pieces of element information in the display region 15a in accordance with a predetermined rule. The rule is a rule that defines the form of arrangement of element information. The form of arrangement of element information may be in, for example, a matrix, a radial shape, or an arch shape. In the example illustrated in FIG. 5, the pieces of element information are arranged in a matrix. Furthermore, this rule may define the order of arrangement of element information, besides the form of arrangement of element information. The order of arrangement of element information may be, for example, the order of update dates of the original first elements or the order of names of the original first elements (in alphabetical order, in the order of the Japanese syllabary, etc.).

As the pieces of element information, the first elements may be transformed to be horizontally long, and these transformed elements may be arranged in the vertical direction and displayed. In short, the pieces of element information in the exemplary embodiment are elements generated on the basis of the first elements.

Figure 6:
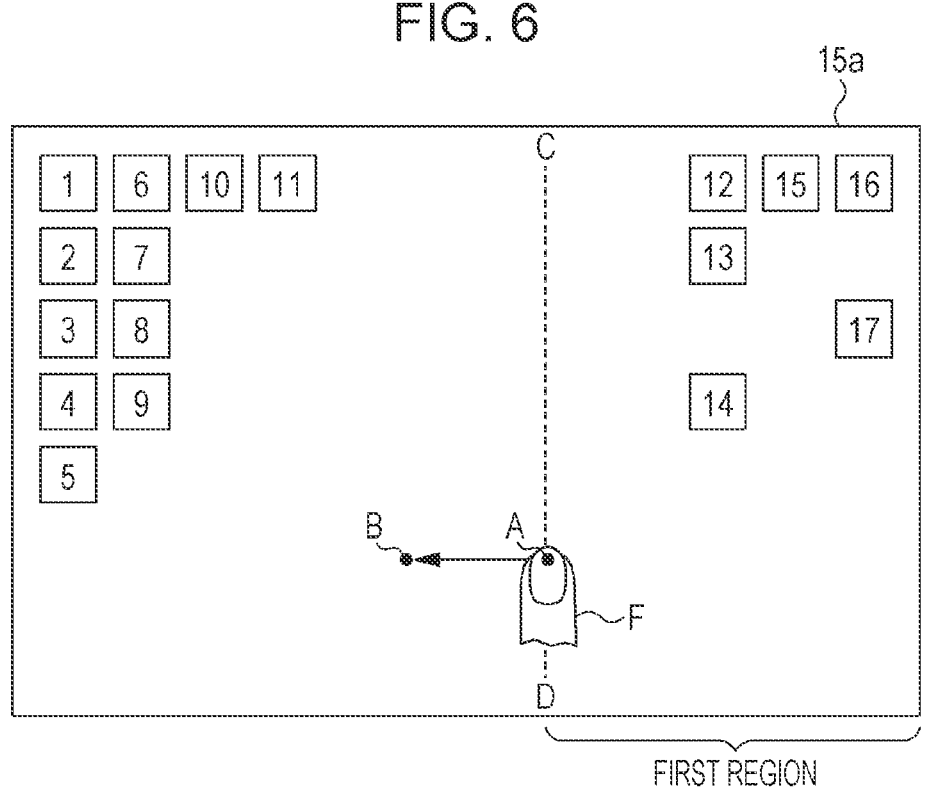
FIG. 6 is a diagram illustrating an exemplary setting of a first region.

FIG. 6 is a diagram illustrating an exemplary setting of the first region. In this example, sliding is performed from a start point A to an end point B. A broken line CD is a virtual perpendicular that passes the start point A and intersects a line segment AB. The controller 11 sets a region behind the perpendicular CD in the direction of movement of the specified point as a first region. In this case, the 12th to 17th elements become first elements.

Figure 7:
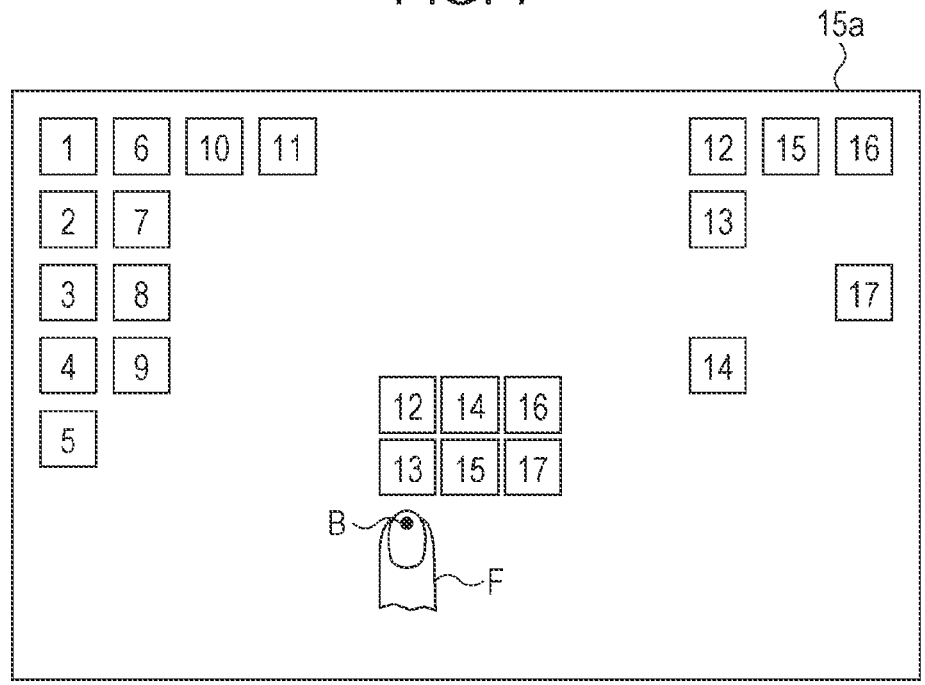
FIG. 7 is a diagram illustrating the arrangement of pieces of element information after an approaching display process is performed.

FIG. 7 is a diagram illustrating the arrangement of pieces of element information after an approaching display process is performed. The controller 11 displays the pieces of element information at positions closer to the specified point B than the positions of the first elements. In an approaching display process in response to sliding, the approaching display unit 104 arranges the pieces of element information in the display region 15a in accordance with a predetermined rule, as in the case of double tapping.

Figure 8:
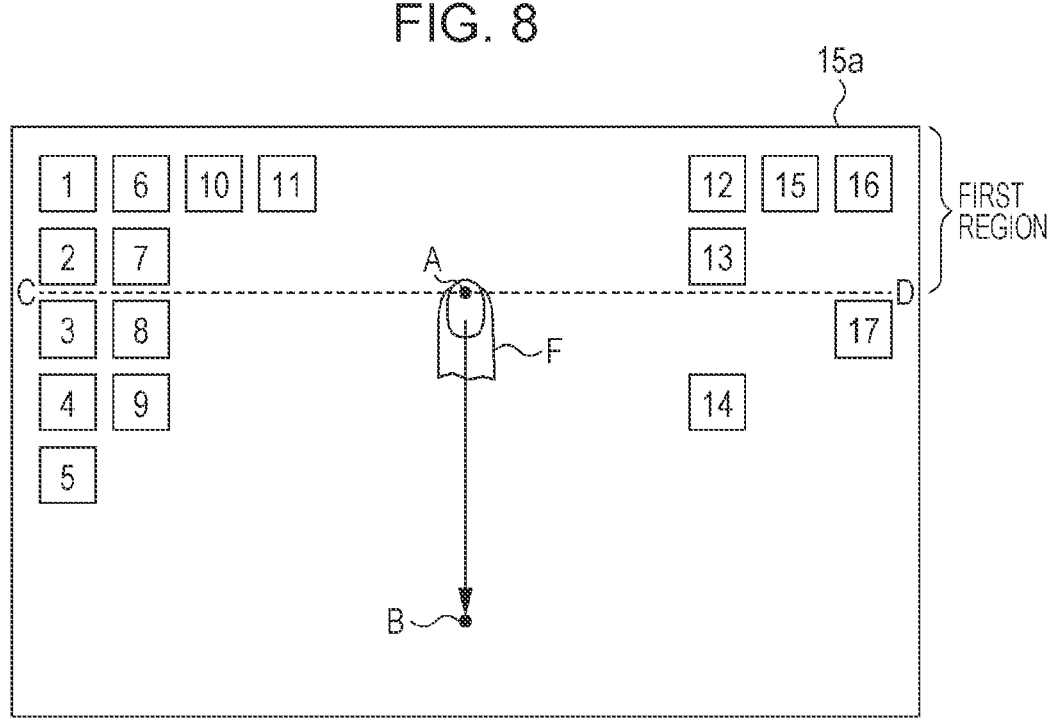
FIG. 8 is a diagram illustrating an exemplary setting of the first region.
Figure 9:
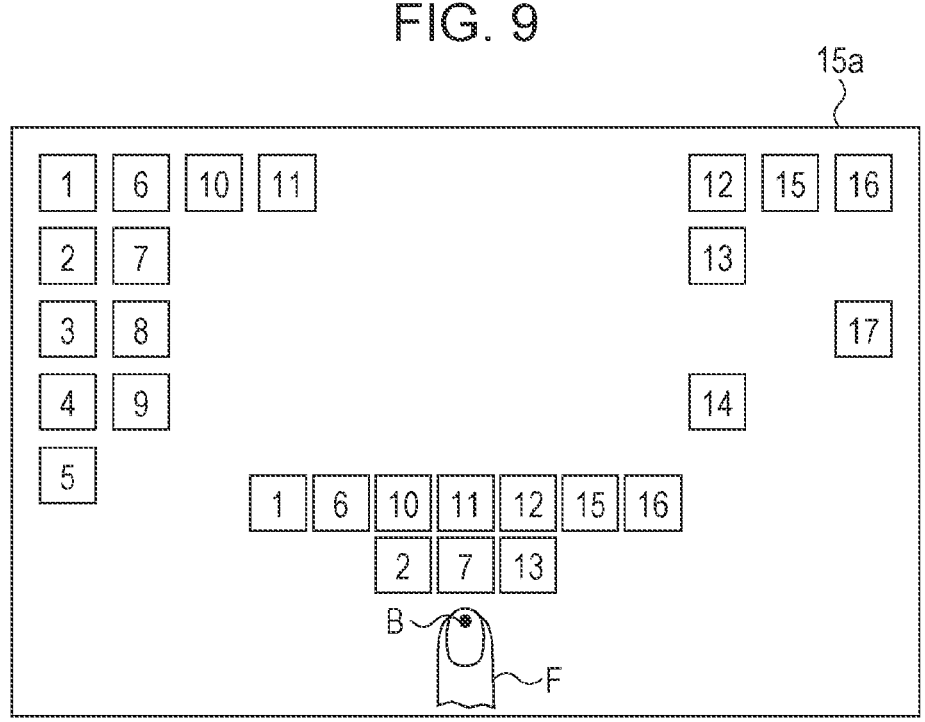
FIG. 9 is a diagram illustrating the arrangement of pieces of element information after an approaching display process is performed.

FIG. 8 is a diagram illustrating an exemplary setting of the first region. FIG. 9 is a diagram illustrating the arrangement of pieces of element information after an approaching display process is performed. In the example illustrated in FIG. 6, the direction of movement of the specified point is horizontal; in the example illustrated in FIG. 8, the direction of movement of the specified point is vertical. In this case, the 1st, 2nd, 6th, 7th, 10th, 11th, 12th, 13th, 15th, and 16th elements become first elements.

Note that sliding may be in any direction.

In response to detection, by the detector 102, of a second operation on element information, an element processor 105 executes a process corresponding to the second operation on a corresponding first element. The exemplary embodiment discusses, as an example of the process corresponding to the second operation, an example of a process of layering elements.

The second operation is double tapping any of the pieces of element information. In response to detection of the second operation, the controller 11 generates a folder, displays a window representing the folder on the display region 15a, and stores the pieces of element information in the window. Here, visually, the pieces of element information are associated with the folder as elements that belong to the folder. Actually, when the pieces of element information are duplicate of the first elements, the controller 11 creates a folder as an element higher in layer than the first elements, and associates the pieces of element information with the folder.

Figure 10:
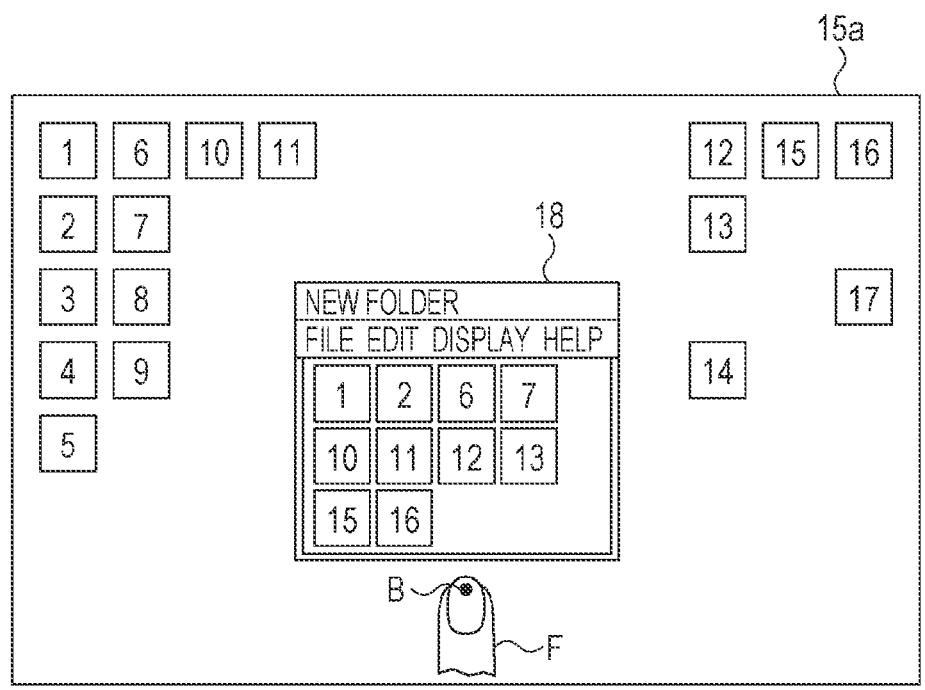
FIG. 10 is a diagram illustrating the layering of elements.

FIG. 10 is a diagram illustrating the layering of elements. This example shows the case in which any of the pieces of element information illustrated in FIG. 9 is double tapped. The pieces of element information are stored in a folder 18.

Next, an erasing unit 106 will be described.

In response to detection, by the detector 102, of a third operation that cancels an approaching display process performed by the approaching display unit 104, the erasing unit 106 erases the element information from the display region 15a. The third operation is an operation in which the user taps the background while the element information is being displayed. In response to detection of the third operation, the controller 11 erases the element information from the display region 15a. The first elements are not erased even when the element information is erased.

Operation of Exemplary Embodiment

Figure 11:
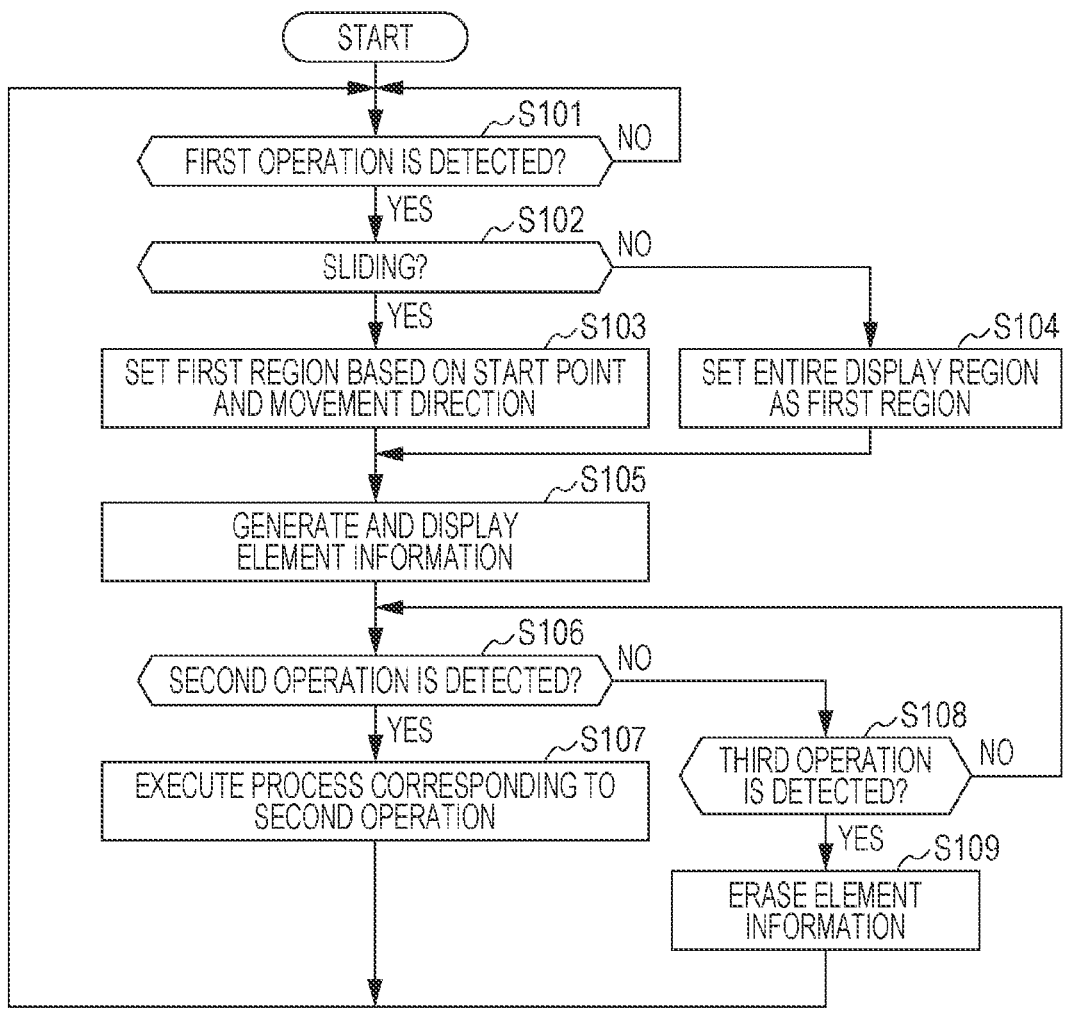
FIG. 11 is a flowchart illustrating the operation of the information processing apparatus.

FIG. 11 is a flowchart illustrating the operation of the information processing apparatus 10. When power of the information processing apparatus 10 is turned on, the controller 11 executes the OS and application program, and controls the information processing apparatus 10 in accordance with the flowchart.

In step S101, the controller 11 periodically determines whether the first operation is detected by using a function as the detector 102. When the first operation is detected (step S101: YES), the process proceeds to step S102.

In step S102, the controller 11 determines whether the first operation is sliding by using a function as the setting unit 103. When the first operation is sliding (step S102: YES), the process proceeds to step S103. When the first operation is not sliding, that is, when the first operation is double tapping (step S102: NO), the process proceeds to step S104.

In step S103, the controller 11 sets a first region on the basis of the position of the start point of sliding and the direction of sliding by using the function as the setting unit 103.

In step S104, the controller 11 sets the entire display region 15a as a first region by using the function as the setting unit 103.

In step S105, the controller 11 displays element information by using a function as the approaching display unit 104.

In step S106, the controller 11 determines whether the second operation is detected by using the function as the detector 102. When the second operation is detected (step S106: YES), the process proceeds to step S107. When the second operation is not detected (step S106: NO), the process proceeds to step S108.

In step S108, the controller 11 determines whether the third operation is detected by using the function as the detector 102. When the third operation is detected (step S108: YES), the process proceeds to step S109. When the third operation is not detected (step S108: NO), the process returns to step S106. The controller 11 periodically repeats the determination in steps S106 and S108 until either the second operation or the third operation is detected.

In step S107, the controller 11 executes a process corresponding to the second operation by using a function as the element processor 105.

In step S109, the controller 11 erases the element information from the display region 15a by using a function as the erasing unit 106.

Modifications

The above-described exemplary embodiment may be modified as described in the following modifications. Alternatively, the exemplary embodiment may be combined with one or more modifications, or multiple modifications may be combined.

First Modification

The exemplary embodiment discusses an example in which the entire display region 15a is set as a first region in response to detection of double tapping. Alternatively, only an element that satisfies a particular condition may become a first element. For example, when the specified point is positioned in a second region that is a portion of the background and that is associated in advance with a condition, the approaching display unit 104 may display element information relating to a first element that satisfies the condition as a position closer to the specified point than the position of the first element. Specific details are as follows.

Figure 12:
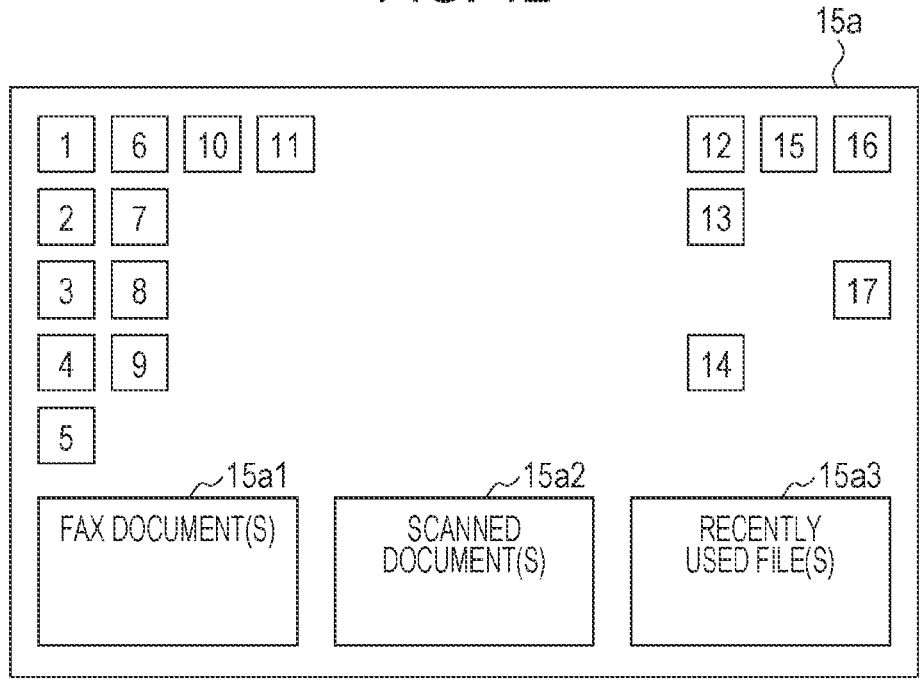
FIG. 12 is a diagram illustrating second regions.

FIG. 12 is a diagram illustrating second regions. Multiple second regions 15a1, 15a2, and 15a3 associated in advance with conditions are set in the display region 15a. The contour of each of the second regions 15a1, 15a2, and 15a3 and a character string that represents a condition are displayed. Note that the contour of each of the second regions 15a1, 15a2, and 15a3 may be any shape. Alternatively, only one second region may be set.

A condition associated with the second region 15a1 specifies that elements are facsimile documents, that is, documents received via the Internet facsimile. The data format of facsimile documents is Portable Document Format (PDF) or Tagged Image File Format (TIFF), and the file name of each facsimile document includes a character string that indicates that the document is a facsimile document. When the second region 15a1 is double tapped, the controller 11 extracts, from among elements displayed in the display region 15a, elements whose extensions are ".pdf" or ".tif", specifies facsimile documents among the extracted elements from their file names, and regards the specified facsimile documents as first elements. As a result, duplicates of the icons of the facsimile documents are generated, and the duplicate icons are displayed in the second region 15a1.

Figure 13:
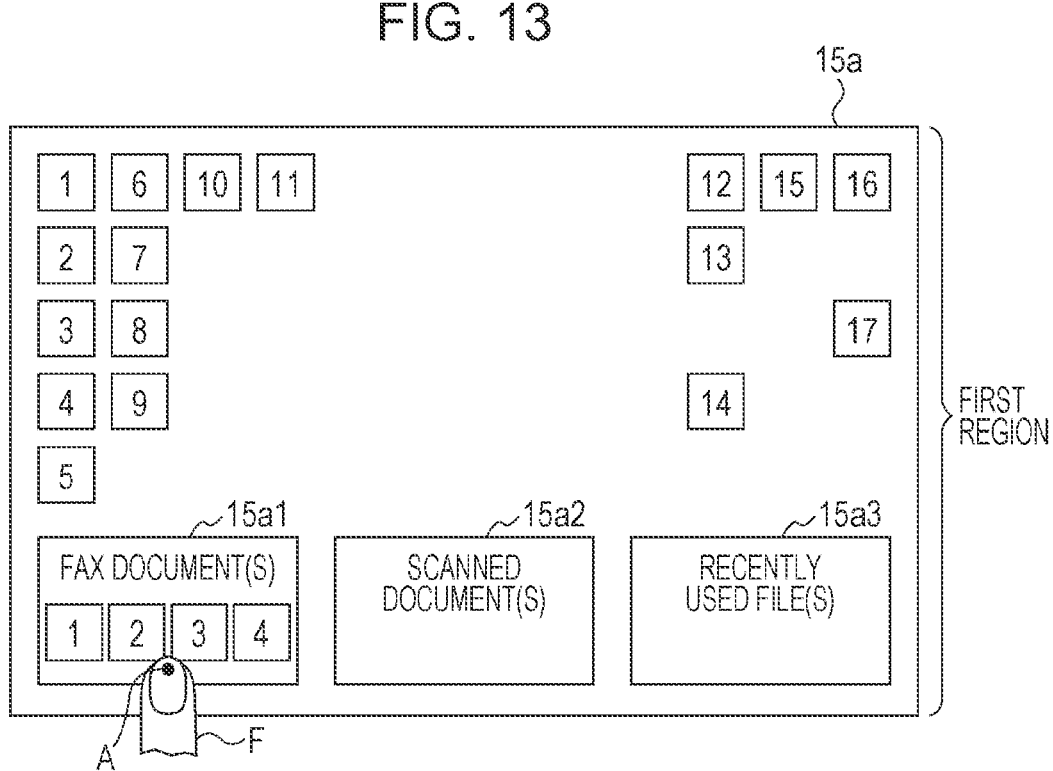
FIG. 13 is a diagram illustrating the arrangement of pieces of element information after an approaching display process is performed.

FIG. 13 is a diagram illustrating the arrangement of pieces of element information after an approaching display process is performed. In this example, the 1st to 4th elements are facsimile documents.

A condition associated with the second region 15a2 specifies that elements are scanned documents, that is, image data generated by optically reading a subject copy of a document. The data format of scanned documents is TIFF. When the second region 15a2 is double tapped, the controller 11 extracts, from among the elements displayed in the display region 15a, elements whose extensions are ".tif", specifies scanned documents that are documents other than facsimile documents among the extracted elements from their file names, and regards the specified scanned documents as first elements. As a result, duplicates of the icons of the scanned documents are generated, and the duplicate icons are displayed in the second region 15a2.

A condition associated with the second region 15a3 specifies that elements are recently used files, that is, a predetermined number of (such as ten) files in descending order of the date of access (browsed, updated, etc.). When the second region 15a3 is double tapped, the controller 11 extracts, from among the elements displayed in the display region 15a, ten files in descending order of the date of access, and regards the extracted files as first elements. As a result, duplicates of the icons of the recently used files are generated, and the duplicate icons are displayed in the second region 15a3.

Second Modification

When multiple elements are displayed in the display region 15a and when the distance between any of these multiple elements and the specified point is less than or equal to a threshold, the approaching display unit 104 may display element information relating to a first element corresponding to the attribute of a second element whose distance from the specified point is less than or equal to the threshold at a position closer to the specified point than the position of the first element. Specific details are as follows.

For example, when double tapping is performed in the vicinity of the 14th element among the elements arranged as in FIG. 4, the controller 11 generates a duplicate of a first element corresponding to the attribute of this element. The vicinity of an element is a point in the background whose distance from the element is less than or equal to a threshold. Since double tapping an element is associated with another operation (such as opening a file or a folder or executing an execution file), double tapping an element is excluded. The attribute of an element includes any type of information that characterizes the element, such as the type or update date of the element.

Figure 14:
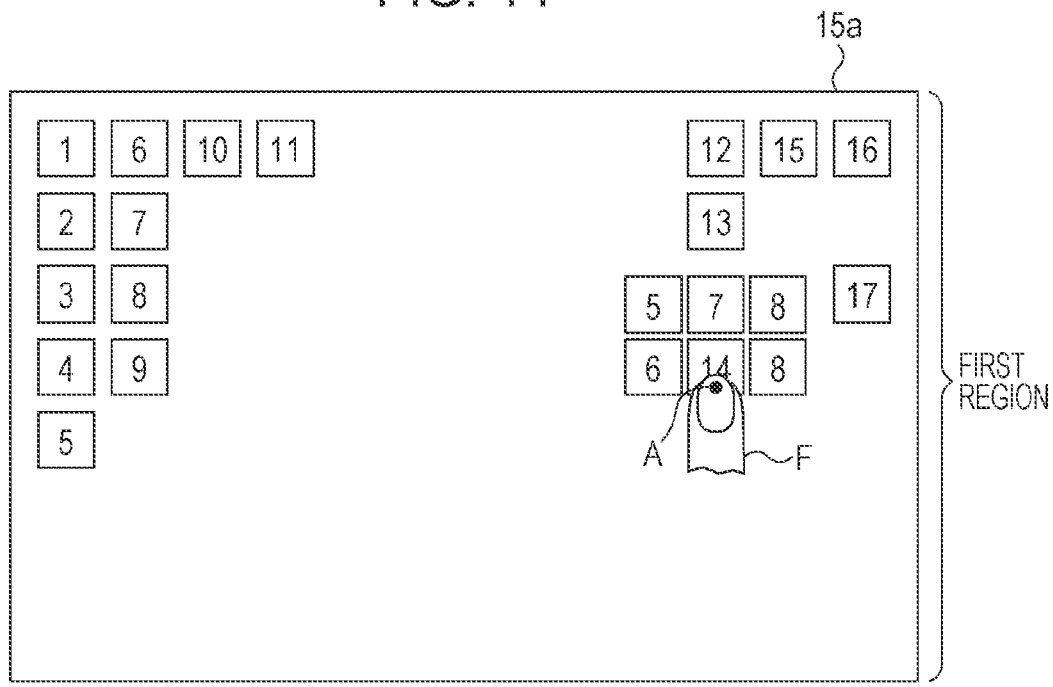
FIG. 14 is a diagram illustrating the arrangement of pieces of element information after an approaching display process is performed.

FIG. 14 is a diagram illustrating the arrangement of pieces of element information after an approaching display process is performed. For example, if the 14th element is a scanned document, the controller 11 specifies scanned documents other than the 14th document, generates duplicates of the icons of the specified scanned documents, and displays the duplicate icons at positions closer to the 14th element than the original icons. In this example, the 5th to 9th elements are scanned documents.

Third Modification

The exemplary embodiment discusses an example in which the approaching display unit 104 arranges the pieces of element information in the display region 15*a* in accordance with the predetermined rule. Alternatively, the approaching display unit 104 may arrange the pieces of element information in accordance with any rule.

Figure 15:
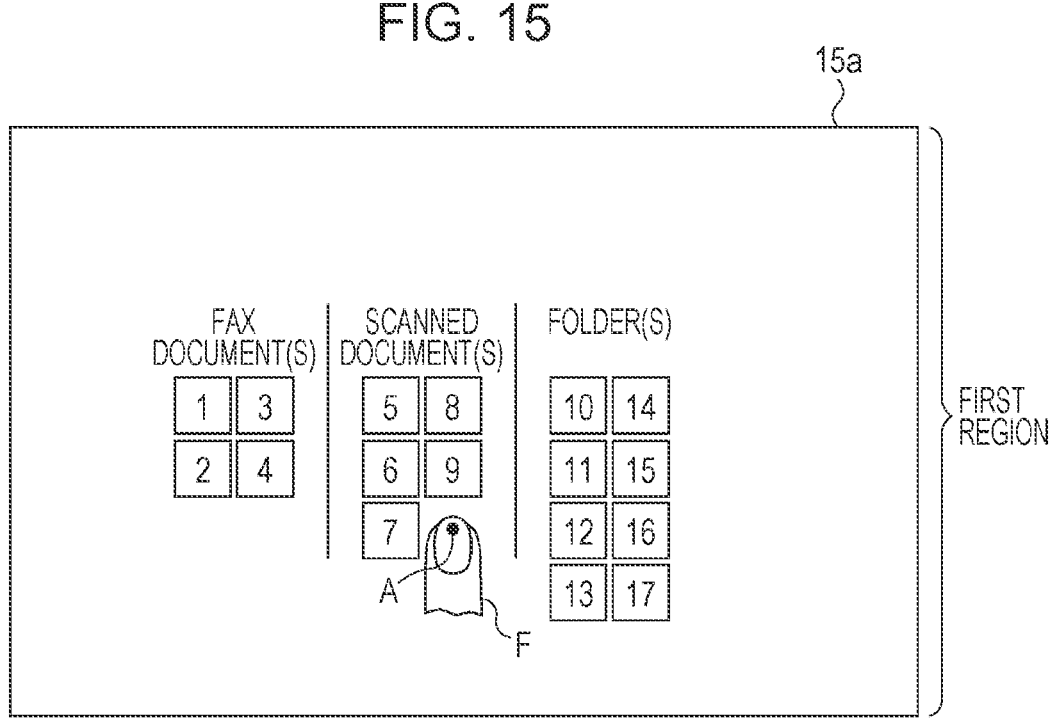
FIG. 15 is a diagram illustrating the arrangement of pieces of element information after an approaching display process is performed.

FIG. 15 is a diagram illustrating the arrangement of pieces of element information after an approaching display process is performed. In this example, elements are classified by type and arranged in a matrix on a type-by-type basis. Note that first elements are omitted in FIGS. 15 to 19.

The display region 15*a* is divided into regions corresponding to a facsimile document(s), a scanned document(s), and a folder(s) from the left. A line segment indicating the boundary of each region, and the name of a type associated with that region are displayed. Alternatively, the line segment and the name of each region may not be displayed. When elements are files (facsimile documents or scanned documents in this example), thumbnails that are size-reduced images representing the details of the files may be displayed.

Figure 16:
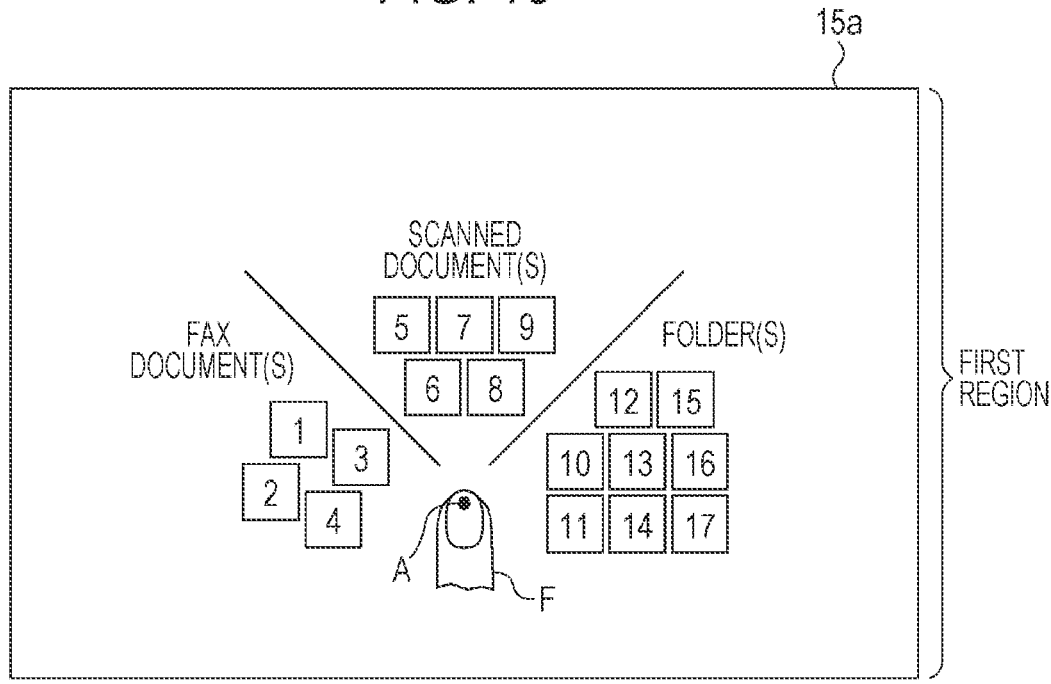
FIG. 16 is a diagram illustrating the arrangement of pieces of element information after an approaching display process is performed.

FIG. 16 is a diagram illustrating the arrangement of pieces of element information after an approaching display process is performed. In this example, the display region 15*a* is divided by boundary lines extending in radial directions.

Figure 17:
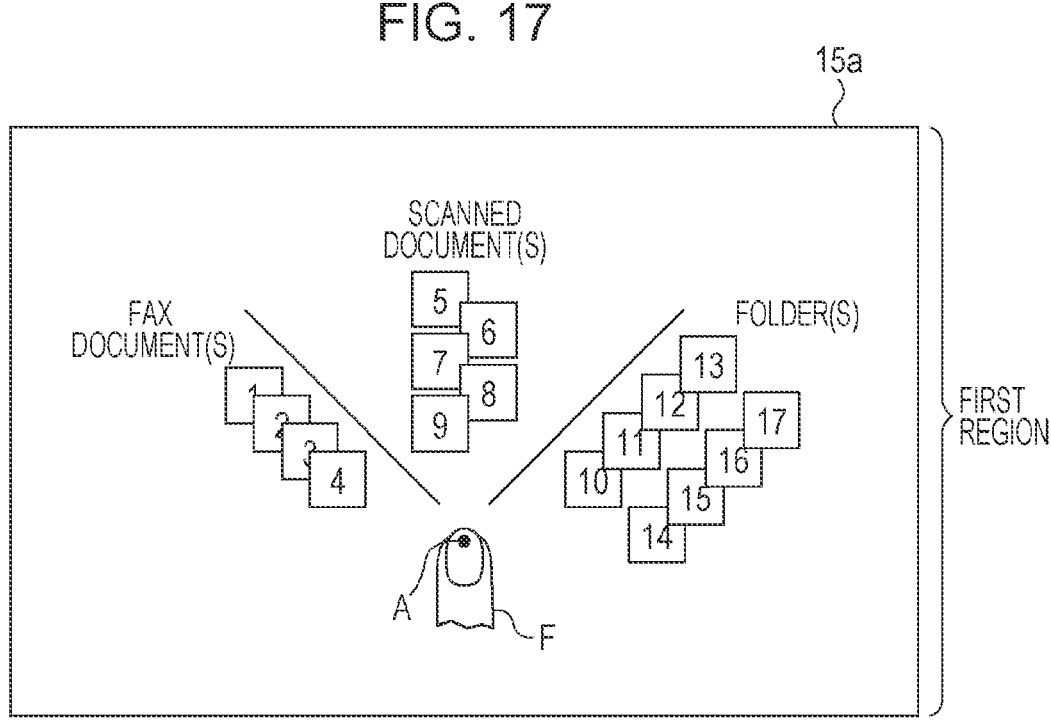
FIG. 17 is a diagram illustrating the arrangement of pieces of element information after an approaching display process is performed.

FIG. 17 is a diagram illustrating the arrangement of pieces of element information after an approaching display process is performed. In this example, elements are arranged in a radial shape on a type-by-type basis. Also in this example, portions of adjacent elements are overlapped. The order of arrangement of the elements is, for example, the order of update dates of the elements or the order of names (file names, folder names, etc.) of the elements (in alphabetical order, in the order of the Japanese syllabary, etc.).

Alternatively, the elements may be arranged at random.

Fourth Modification

The approaching display unit 104 may change the external appearance of first elements that satisfy a predetermined condition.

Figure 18:
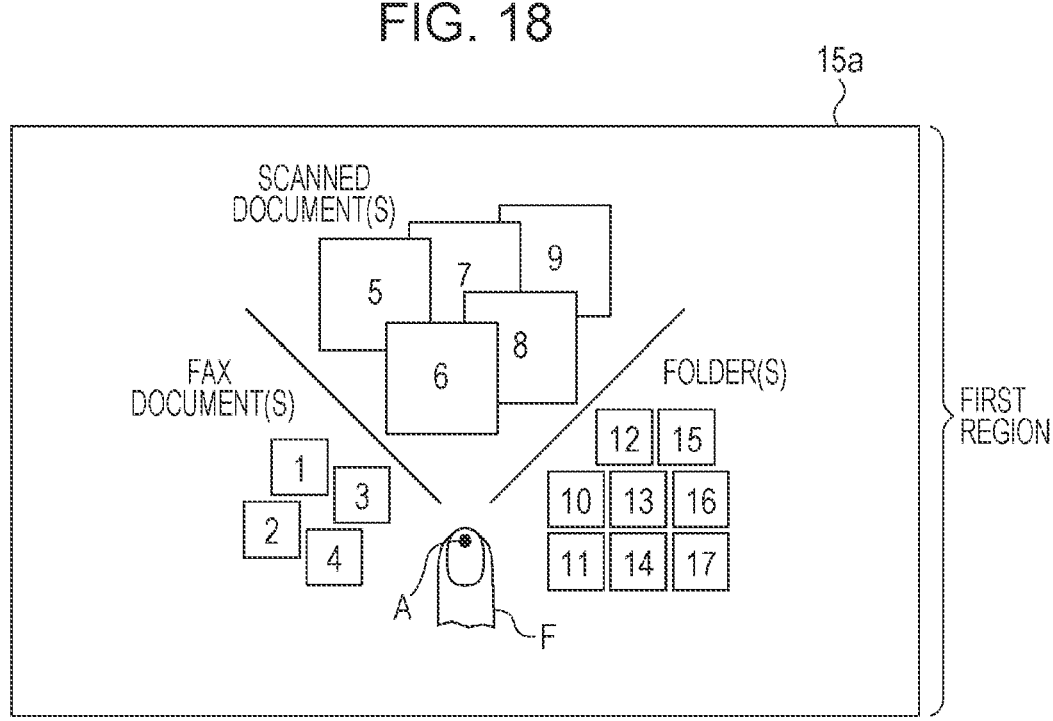
FIG. 18 is a diagram illustrating the arrangement of pieces of element information after an approaching display process is performed.

FIG. 18 is a diagram illustrating the arrangement of pieces of element information after an approaching display process is performed. In this example, the condition specifies that first elements are scanned documents. Thus, thumbnails of the scanned documents are displayed, and these thumbnails are enlarged.

Fifth Modification

The exemplary embodiment discusses an example in which an example of a process of layering elements is given as an example of the process corresponding to the second operation. Alternatively, the process corresponding to the second operation may be any process. For example, when element information is tapped as the second operation, the controller 11 recognizes that the tapped element information is selected. In this case, the controller 11 changes the external appearance of a first element that is the original of the tapped element information, which is a duplicate of the first element, by, for example, highlighting the first element, and erases the element information (selecting process).

A process performed on the first element may be made different according to the details of the second operation, such that the above-described selecting process is executed when element information is tapped, whereas the layering process is executed when element information is double tapped.

Alternatively, in a state where an approaching display process is performed, a menu including various predetermined second operations may be displayed in the display region 15*a*, and the user may select a second operation from the menu.

Sixth Modification

When multiple first operations are performed, and when the same first elements are selected in response to these first operations, the approaching display unit 104 may display pieces of element information, the number of which corresponds to the number of these first operations, at positions closer to the specified points of these first operations than the positions of the first elements.

Figure 19:
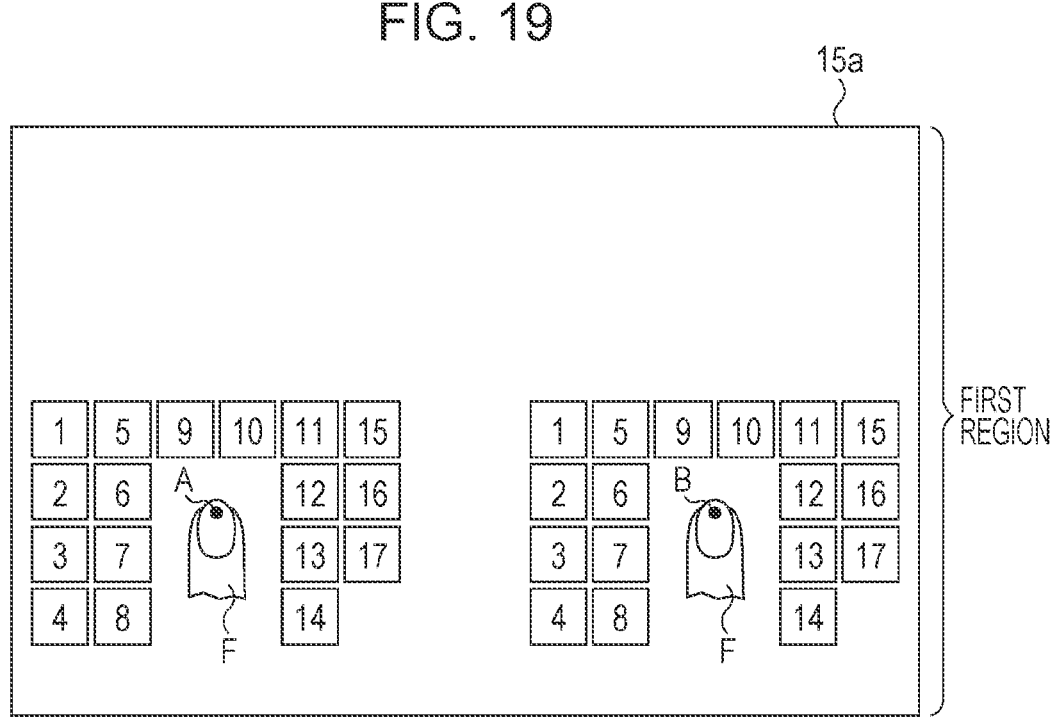
FIG. 19 is a diagram illustrating the arrangement of pieces of element information after an approaching display process is performed.

FIG. 19 is a diagram illustrating the arrangement of pieces of element information after an approaching display process is performed. In this example, in a state where the elements are arranged as in FIG. 4, different users double tap two different specified points A and B almost at the same time. In this case, two sets of duplicates of the 1st to 17th elements are generated, and the generated sets of duplicates are displayed at positions closer to the specified points A and B than their originals.

Seventh Modification

The exemplary embodiment discusses an example in which a region behind the perpendicular CD, which passes the start point A and which intersects the line segment AB (B is the end point), in the direction of movement of the specified point is set as a first region. Alternatively, another region may be set as a first region.

Figure 20:
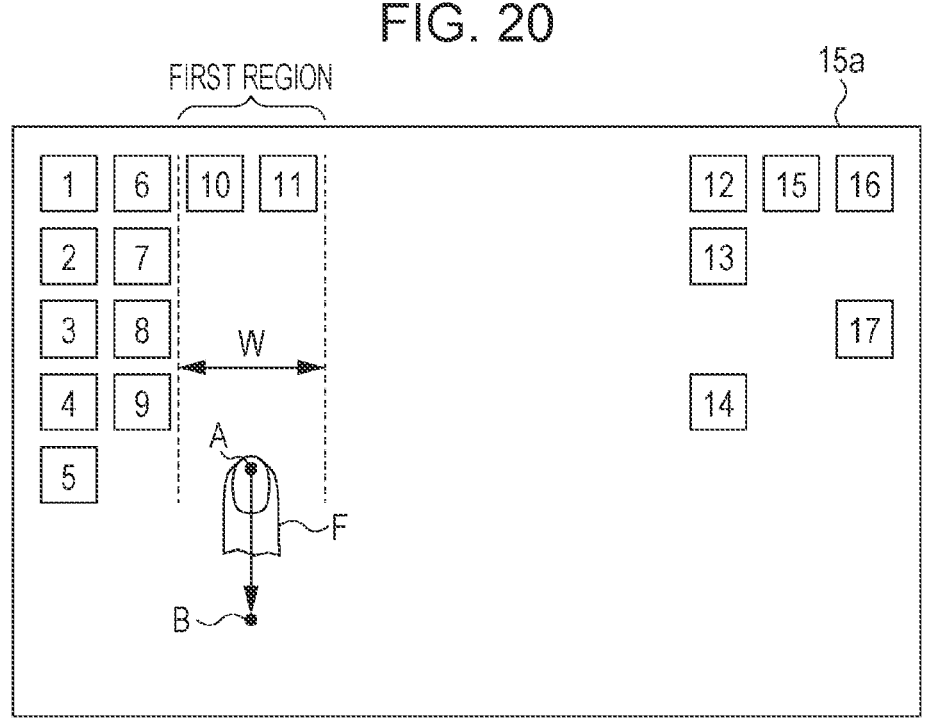
FIG. 20 is a diagram illustrating an exemplary setting of the first region.
Figure 21:
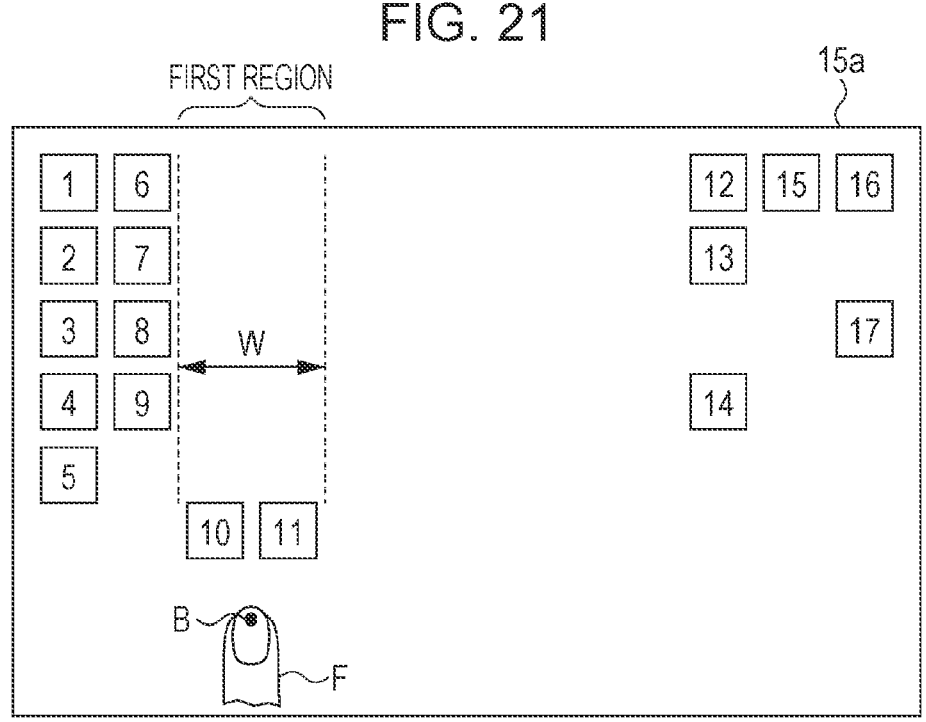
FIG. 21 is a diagram illustrating the arrangement of pieces of element information after an approaching display process is performed.

FIG. 20 is a diagram illustrating an exemplary setting of the first region. FIG. 21 is a diagram illustrating the arrangement of pieces of element information after an approaching display process is performed. In this case, a belt-shaped region with a width W, which extends in the direction of sliding, is set as a first region. In this case, the 10th and 11th elements become first elements.

Alternatively, sliding may be performed toward the first elements. For example, when sliding is performed from a point B serving as a start point to an end point A in FIG. 20, the 10th and 11th elements become first elements.

Figure 22:
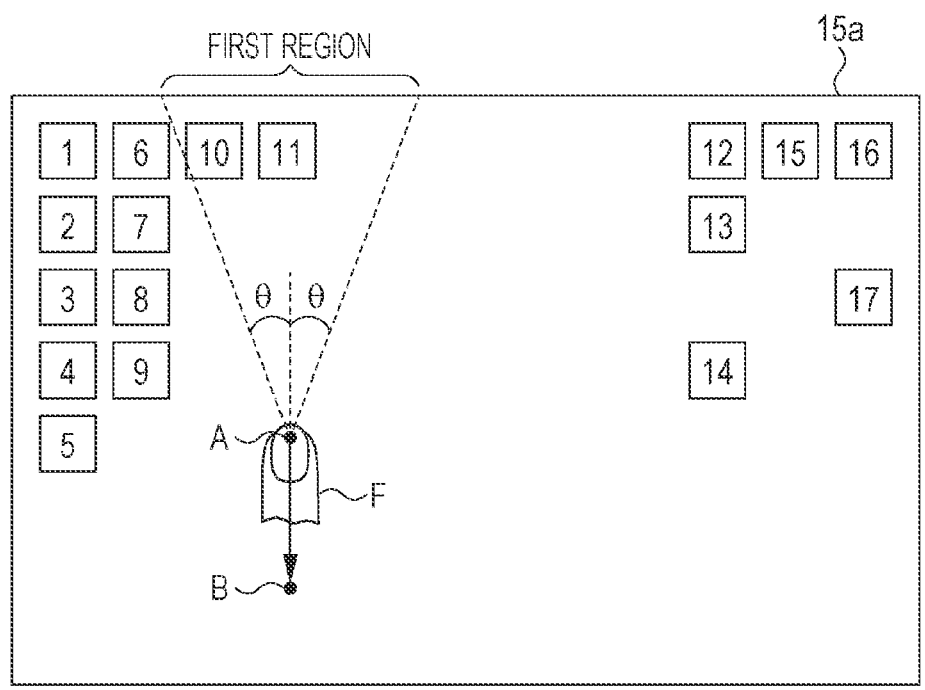
FIG. 22 is a diagram illustrating an exemplary setting of the first region.

FIG. 22 is a diagram illustrating an exemplary setting of the first region. In this example, a fan-shaped region that extends at an angle θ on both sides of an extension of a line segment AB, behind the direction of sliding, is set as a first region. In this case, the 10th and 11th elements become first elements. Also in this case, sliding may be performed toward the first elements.

Eighth Modification

A region where the distance from the double-tapped specified point is greater than or equal to a threshold may be set as a first region. Alternatively, a region where the distance from the double-tapped specified point is less than or equal to a threshold may be set as a first region.

Ninth Modification

The exemplary embodiment discusses an example in which element information is an element generated on the basis of a first element, such as a duplicate of a first element. However, element information may by any information as long as it relates to a first element. For example, information indicating which element is a first element may be displayed as element information. Specifically, in the example illustrated in FIG. 5, instead of the duplicates of the first elements, character strings listing the file names, folder names, application program names, or the like of the first elements may be displayed. Alternatively, in the examples illustrated in FIGS. 15 to 18, character strings listing file names or folder names corresponding to the regions of facsimile documents, scanned documents, and folders may be displayed in the respective regions.

Tenth Modification

The exemplary embodiment discusses an example in which the first elements are specified by the user by touching the display region 15*a*. Alternatively, another system in which the first elements are specified without touching the display region 15*a* may be used. For example, a system in which the position of the user's finger or a pen is specified by using an infrared ray or the like may be used, or a system in which a position indicated by the user's finger, face, eyeball, or the like is specified by capturing an image of the finger, face, eyeball, or the like and analyzing the image may be used.

Although the exemplary embodiment discusses an example in which a touch panel is used, a system in which the first element is specified by using a mouse or a joystick may be used.

Eleventh Modification

The exemplary embodiment discusses, as an example of the information processing apparatus 10, an example in which all the hardware items are provided in the housing 19. Alternatively, the information processing apparatus 10 may be a notebook PC in which a housing including the display 15 and a housing including hardware items other than the display 15 are attached to each other with a hinge. Alternatively, the information processing apparatus 10 may include hardware other than the display 15, and the information processing apparatus 10 and the display 15 (display apparatus) may be connected by signals or wireless communication units.

Twelfth Modification

The exemplary embodiment discusses an example in which the above-described functions are realized when the controller 11 of the information processing apparatus 10 executes the application program. Alternatively, the same or similar functions as those in the exemplary embodiment may be implemented in hardware on the information processing apparatus 10. Alternatively, the program may be provided by being recorded on a computer readable recording medium, such as an optical recording medium or a semiconductor memory, and the program may be read from the recording medium and stored in the memory 12 of the information processing apparatus 10. Alternatively, the program may be provided via an electric communication line.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   a display configured to display an image including the arrangement of one or more elements on a display region of the display, each of the one or more elements characterized by a type from among a plurality of types;
   a detector configured to detect an operation performed in the display region;
   a setting unit configured to set, in response to detection, by the detector, of a first operation including an operation in which a point in the background of the display region where no element is displayed is specified as a specified point, a first region that is the entirety or a portion of the display region in accordance with details of the first operation;
   an approaching display unit configured to display element information relating to a first element displayed in the first region, set by the setting unit, at a position closer to the specified point than the position of the first element prior to detection of the first operation; and
   an element processor configured to execute, in response to detection, by the detector, of a second operation performed on the element information, a process corresponding to the second operation on the first element, the process being predetermined in accordance with the type of the first element,
   wherein the element processor is configured to execute, in response to the detection, by the detector, of the second operation performed on the element information, the process corresponding to the second operation on the first element and another element characterized by a same type as the type of the first element, and
   wherein the element information is not displayed prior to the first operation, and the first element and the element information are both simultaneously displayed after the first operation.

2. The information processing apparatus according to claim 1, wherein, when the first operation includes an operation of moving the specified point, the setting unit sets the first region on the basis of the position of a start point of a movement path of the specified point and the direction of movement of the specified point.

3. The information processing apparatus according to claim 2, wherein, when the first operation includes no operation of moving the specified point, the setting unit sets the entirety of the display region as the first region.

4. The information processing apparatus according to claim 2, wherein all elements within the set first region are determined as first elements for which element information is displayed by the approaching display unit.

5. The information processing apparatus according to claim 2, wherein the setting unit sets the first region prior to the approaching display unit displaying the element information at the position closer to the specified point than the position of the first element prior to the detection of the first operation.

6. The information processing apparatus according to claim 3, wherein, when the specified point is positioned in a second region that is a portion of the background and that is associated in advance with a condition, the approaching display region displays element information relating to a first element that satisfies the condition at a position closer to the specified point than the position of the first element.

7. The information processing apparatus according to claim 3, wherein, when a plurality of elements are displayed in the display region and when the distance between any of the elements and the specified point is less than or equal to a threshold, the approaching display unit displays element information relating to a first element corresponding to an attribute of a second element whose distance from the specified point is less than or equal to the threshold at a position closer to the specified point than the position of the first element.

8. The information processing apparatus according to claim 6, wherein, when a plurality of elements are displayed in the display region and when the distance between any of the elements and the specified point is less than or equal to a threshold, the approaching display unit displays element information relating to a first element corresponding to an attribute of a second element whose distance from the specified point is less than or equal to the threshold at a position closer to the specified point than the position of the first element.

9. The information processing apparatus according to claim 1, wherein, when the first operation includes no operation of moving the specified point, the setting unit sets the entirety of the display region as the first region.

10. The information processing apparatus according to claim 9, wherein, when the specified point is positioned in a second region that is a portion of the background and that is associated in advance with a condition, the approaching display region displays element information relating to a first element that satisfies the condition at a position closer to the specified point than the position of the first element.

11. The information processing apparatus according to claim 10, wherein, when a plurality of elements are displayed in the display region and when the distance between any of the elements and the specified point is less than or equal to a threshold, the approaching display unit displays element information relating to a first element corresponding to an attribute of a second element whose distance from the specified point is less than or equal to the threshold at a position closer to the specified point than the position of the first element.

12. The information processing apparatus according to claim 9, wherein, when a plurality of elements are displayed in the display region and when the distance between any of the elements and the specified point is less than or equal to a threshold, the approaching display unit displays element information relating to a first element corresponding to an attribute of a second element whose distance from the specified point is less than or equal to the threshold at a position closer to the specified point than the position of the first element.

13. The information processing apparatus according to claim 1, wherein the approaching display unit arranges the element information in the display region in accordance with a document type of the first element.

14. The information processing apparatus according to claim 1, wherein the approaching display unit changes the external appearance of the element information satisfying a predetermined condition.

15. The information processing apparatus according to claim 1, wherein, when a plurality of first operations are performed and when the same first element corresponds to the plurality of first operations, the approaching display unit displays each of pieces of element information corresponding to the number of the plurality of first operations at a position closer to a corresponding one of specified points of the plurality of first operations than the position of the first element.

16. The information processing apparatus according to claim 1, further comprising the display.

17. The information processing apparatus according to claim 1, wherein the executed process varies according to the plurality of types.

18. The information processing apparatus according to claim 1, wherein the approaching display unit displays the element information at the position closer to the specified point while the display continues to display the first element at the position of the first element prior to the detection of the first operation.

19. The information processing apparatus according to claim 1, wherein the process performed on the first element varies according to a type of the second operation.

20. The information processing apparatus according to claim 1, wherein the display is configured to display a menu including a plurality of selectable second operations, and the element processor is configured to execute the process corresponding to the second operation selected by a user from among the plurality of selectable operations included in the menu.

21. The information processing apparatus according to claim 1, wherein the element processor is configured to execute, in response to the detection, by the detector, of the second operation performed on the element information, a process in which a folder is generated, a window representing the folder is displayed on the display region, and the element information is included in the window.

22. An information processing method comprising:
  displaying an image including the arrangement of one or more elements on a display region of a display, each of the one or more elements characterized by a type from among a plurality of types;
  detecting an operation performed in the display region;
  setting, in response to detection of a first operation including an operation in which a point in the background of the display region where no element is displayed is specified as a specified point, a first region that is the entirety or a portion of the display region in accordance with details of the first operation;
  displaying element information relating to a first element displayed in the first region at a position closer to the specified point than the position of the first element prior to detection of the first operation; and
  executing, in response to detection of a second operation performed on the element information, a process corresponding to the second operation on the first element, the process being predetermined in accordance with the type of the first element,
  wherein the executing comprises executing, in response to the detection of the second operation performed on the element information, the process corresponding to the second operation on the first element and another element characterized by a same type as the type of the first element, wherein the element information is not displayed prior to the first operation, and the first element and the element information are both simultaneously displayed after the first operation.

23. An information processing apparatus comprising:
a touch panel configured to display a plurality of icons in a display region and that detects an operation performed in the display region, each of plurality of icons characterized by a type from among a plurality of types;
an approaching display unit configured to display, in response to detection of an operation performed in a background portion other than the icons displayed in the display region, one or more icons displayed in the display region in the vicinity of a position where the operation is detected; and
an element processor configured to execute, in response to a second operation performed on an icon of the one more icons, a process corresponding to the second operation on the icon, the process being predetermined in accordance with the type of the icon,
wherein the executing comprises executing, in response to the detection of the second operation performed on the element information, the process corresponding to the second operation on the first element and another element characterized by a same type as the type of the first element,
wherein the element information is not displayed prior to the first operation, and the first element and the element information are both simultaneously displayed after the first operation.

* * * * *